United States Patent [19]

Eisenberg et al.

[11] 4,139,868

[45] Feb. 13, 1979

[54] DEVICE FOR MULTIPLEXING VIDEO SIGNALS

[75] Inventors: Robert M. Eisenberg, Woodbine; George R. Quick, Silver Spring, both of Md.

[73] Assignee: The Singer Company, Binghamton, N.Y.

[21] Appl. No.: 789,547

[22] Filed: Apr. 21, 1977

[51] Int. Cl.² .............................................. H04N 5/78
[52] U.S. Cl. .................................. 360/33; 35/22 R; 358/127; 358/104; 358/146; 360/18; 360/11; 328/123; 35/12 N
[58] Field of Search ............... 358/104, 146, 108, 127; 360/33, 31, 18, 11, 9; 35/12 N, 11 A, 22 R; 328/123

[56] References Cited

U.S. PATENT DOCUMENTS

| 3,493,677 | 2/1970 | Paine | 360/9 |
| 3,686,434 | 8/1972 | Lemelson | 360/18 |
| 3,811,008 | 5/1974 | Lee | 360/18 |
| 3,991,266 | 11/1976 | Baer | 358/146 |
| 3,996,672 | 12/1976 | Osofsky | 35/12 N |
| 4,001,499 | 1/1977 | Dowell | 35/12 N |
| 4,015,080 | 3/1977 | Moore-Searson | 358/104 |
| 4,027,333 | 5/1977 | Kaiser | 360/11 |

Primary Examiner—Stuart N. Hecker
Assistant Examiner—Alan Faber
Attorney, Agent, or Firm—Ronald Reichman; Jeff Rothenberg

[57] ABSTRACT

This invention relates to a system that permits a video tape recorder to simultaneously record a plurality of independently occurring events. The system causes the events to be multiplexed before they are recorded and a coded signal to be recorded on the tape so that when the tape is played back, the events may be demultiplexed in the same order that they were recorded.

7 Claims, 2 Drawing Figures

DEVICE FOR MULTIPLEXING VIDEO SIGNALS

BACKGROUND OF THE INVENTION

1. Field of the Invention

This invention relates to electronic circuits and, more particularly, to systems that multiplex and demultiplex video signals so that the signals may be recorded and played back at another time.

2. Description of the Prior Art

Man has invented simulators and other training devices to teach students to use and operate various types of equipment without undergoing the dangers that are inherent in the equipment's actual operation. It is a great deal safer to learn how to fly an aircraft on the ground in a simulator than in an actual aircraft in the air.

People have sense organs which react to physical stimulation. These sense organs are continuously stimulated by a simulator. After the student performs some maneuver on the simulator, the simulated flight usually continues and, upon the conclusion of the flight, the student usually forgets what he has done to perform a particular maneuver of the aircraft. Thus, it would be beneficial to the student's training if the visual picture that the student sees and the readings of the simulated aircraft's instruments could be recorded during the simulated flight so that the student may play back the recorded information and learn from his mistakes. In the past, one of the only ways that the foregoing could be accomplished was to have one moving picture camera or video tape recorder record what the pilot sees outside the aircraft and have a second moving picture camera or video tape recorder record the readings that appear on the aircraft's instruments. When the student and his instructor wanted to study the simulated flight, each of the recordings were played back on a different motion picture projector or video tape recorder. The nature of the recorders and playback devices was such that when the two recordings were attempted to be played back at the same time, the recordings would be out of synchronization. Hence, the student would receive little training value viewing the recordings since he would not see the correct instrument readings corresponding to what he saw outside of the cockpit of the simulated aircraft. Thus, in the prior art, the student's simulated flight was not recorded where simultaneous playback was required.

SUMMARY OF THE INVENTION

This invention overcomes the disadvantages of the prior art by providing a system that converts randomly written display information into a television format suitable for recording on a standard television tape recorder and enables the recording and playback of a multiplicity of television formatted sources closely synchronized in time on one standard video tape recorder. Since recordings of two or more distinct scenes are wanted, a group of pictures for each scene are made in rapid succession, each picture for a particular scene will record the position of the various parts of the subject at the moment of exposure, and the series of pictures will represent successive phases in the movement of the different parts of the subject. Then, if these same pictures are viewed or projected in the order in which they were made and with sufficient rapidity so that the human eye will merge the information contained in the various pictures into one another, the human viewer will be enabled to believe that he is seeing the various pictures in motion.

The recording of the two or more scenes are performed in such a manner that when the recordings are played back for viewing purposes, the two recordings are time synchronized. Thus, when one views the recordings, the viewer will believe that he sees the events in the two or more simultaneous scenes that were recorded in the order in which the events of the scenes took place. This time synchronization is maintained during any sequence of the playback mode and is also maintained during the fast forward, stop and rewind functions of the recorder.

The foregoing system will separately record the two or more simultaneous scenes as they are taking place by recording the alternate frames per scene. Thereupon, the recorded frames from the scenes will be multiplexed. One complete frame (consisting of two fields) per scene will be recorded before the multiplexer selects the frame to be recorded from the other scene. All of the odd frames from the first scene will be recorded and all of the even frames from the second scene will be recorded. This recording process continues until the operator of the system decides to stop recording the scenes. If more than two scenes are required, the frames from the various scenes will be multiplexed in a different order.

Replay of the recorded information is accomplished by separating or demultiplexing the alternate frames that are produced for the various scenes and the outputting of the composite video frames produced for each scene to a particular display monitor that is provided for each scene.

Thus, this invention will be useful to a student using operational equipment or a student using some type of training simulator, since the student will be able to see what he actually did on the operational equipment and/or training simulator. The student's instructor will also find this invention useful since the instructor will be able to show and explain to a particular student the errors that the student has made. Furthermore, a group of students may review their performances on the simulators and opearational equipment.

It is an object of this invention to provide a new and improved system for visually reproducing the events that simultaneously take place in a plurality of scenes.

It is another object of this invention to provide a new and improved system for video recording and playing back a plurality of events that simultaneously take place.

It is a further object of this invention to provide a new and improved system for synchronizing two or more recordings consisting of different information so that, when the recorded information is played back, the information that was recorded for each event will appear in the order that it occurred.

Other objects and advantages of this invention will become more apparent as the following description proceeds, which description should be considered together with the accompanying drawings.

DESCRIPTION OF A PREFERRED EMBODIMENT

Figure 1:
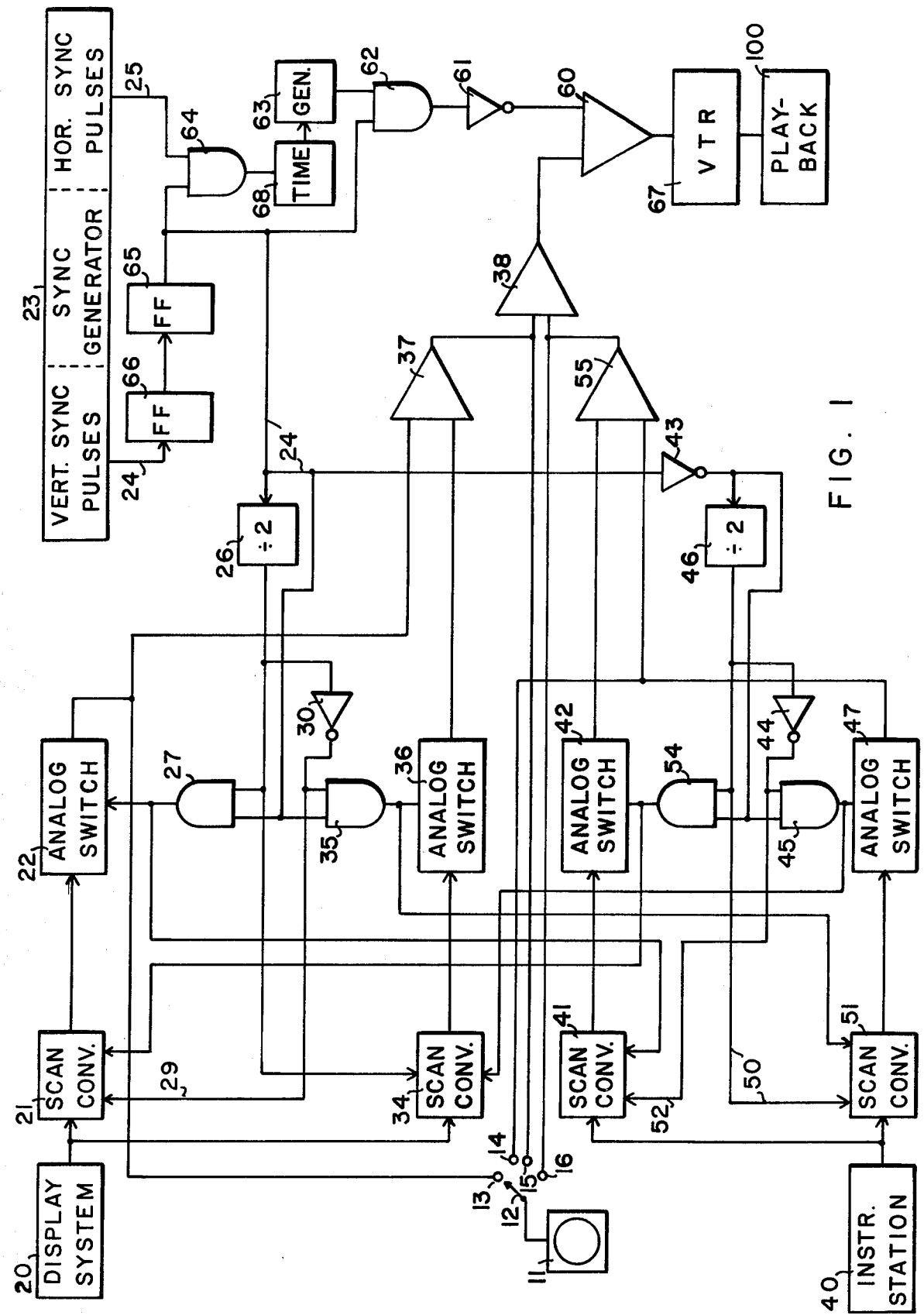
FIG. 1 is a schematic diagram of the electrical system that comprises the recording portion of this invention.

Referring now to the drawings in detail and, more particularly, to FIG. 1, the reference character 11 designates a display monitor that is used to monitor the video signals that are being recorded by this system. Monitor 11 is connected to this system by means of a four-position manually operated switch arm 12. Switch arm 12 may be positioned to monitor what is being seen on the display system by being adjusted to terminal 13 and switch arm 12 may be moved to terminal 14 to monitor the information that is currently appearing at the instructor's station. If switch arm 12 is moved to terminal 15, monitor 11 will display the multiplexed display signal and, if switch arm 12 is moved to terminal 16, monitor 11 will display the multiplexed instructor's station signal. The purpose of monitor 11 is to provide a means of verifying that the switching and multiplexing of the video signals are being properly processed. The display system, instructor's station, multiplexed display signal and multiplexed instructor's signal will be described as this description proceeds.

Display system 20 is the system that produces the scenes that the student is currently viewing. For instance, display system 20 may be the system described in U.S. Pat. No. 3,996,672 entitled "Real-Time Simulation of a Point System as Viewed by a Moving Observer" which issued on Dec. 14, 1976. The output of display system is an x, y stroke writing type signal which is coupled to the input of the scan converter device 21 which may be a Lithicon scan converter tube and its associated electronics. The output of the scan converter device 21 is a conventional television raster format signal that is coupled to the input of analog switch 22. Scan converter device 21 will record in its memory the signals produced by display system 20 when a positive pulse is present on line 29. One end of line 29 is connected to the input of device 21 and the other end of line 29 is connected to the output of inverter 30 and to one of the inputs of AND gate 35. Inverter 30 is connected to the output of divide-by-two frequency divider 26. The input of divider 26 is connected via line 24 to the output of flip flop 65 which receives its input from flip flop 66, which receives its input from sync generator 23. Thus, device 21 will only record information into its memory when the output of divider 26 is positive. The information that has been recorded into the memory of device 21 will be erased when AND gate 54 is enabled. AND gate 54 has two inputs, one of which is the output of divide-by-two frequency divider 46 and the other input is the output of inverter 43. The input of divider 46 is connected to the output of inverter 43 and the input of inverter 43 is connected to the output of flip flop 65 via line 24. When analog switch 22 is enabled, it produces a signal that corresponds to every other odd frame. Switch 22 will only output data when it is enabled by the output of AND gate 27. Gate 27 has two inputs, one of which is the output of divider 26 and the other input to gate 27 is line 24. The other end of line 24 is connected to the output of flip flop 65. Line 24 is also connected to the input of divider 26. Sync generator 23 transmits a vertical sync pulse via line 24 to the input of flip flop 66 and a horizontal sync pulse via line 25. Thus, the output signal of switch 22 may be considered to consist of field one of the display system signal and field two of the display system signal which comprise frame one of the display system (two fields equal one frame). The next three frames of the display system signal are skipped and then switch 22 will output the first and second fields of frame five of the display system signal. Hence, the output of switch 22 will be the following display system frames: one, five, nine, thirteen, etc. The output of switch 22 is coupled to one of the two inputs of mixing amplifier 37 and the output of amplifier 37 is coupled to one of the two inputs of amplifier 38.

Analog switch 36 functions in the same manner as switch 22. The difference is that while analog switch 22 passes frames one, five, nine, etc. (every other odd frame) of the display system signal, analog swtich 36 passes frames three, seven, eleven, etc. (every other odd frame, but displaced one odd frame from the output of analog switch 22). The output signal from mixing amplifier 37 therefore is a signal containing only the odd frames of the display system 20 signal. An identical system is provided to process the instructor's station 40 signal which will be hereinafter described which produces only the even frames of that signal which are the interleaved with the odd frames from the display system 20 (via the mixing amplifier 38). The output of mixing amplifier 38 thus consists of all of the odd frames of the display system 20 signal and all of the even frames of the instructor's station 40 signal alternately on a frame-by-frame basis.

Device 34 can be a Lithicon scan converter tube and its associated electronics. The input of device 34 is coupled to the output of display 20 and the output of device 34 is coupled to the input of analog switch 36. Scan converter device 34 is used to insure sufficient time to erase the information stored in device 21 and to allow for the possibility of a write cycle over running a frame time period. The output of display 20 is stored in device 34 when a positive pulse from divider 26 arrives at device 34. This information is erased when AND gate 45 is enabled. AND gate 45 has two inputs. One of the inputs to gate 45 is the output of inverter 44. The other input to gate 45 is coupled to the output of inverter 43 whose input is the output of flip flop 65. The output of flip flop 66 is connected to the input of flip flop 65 and the output of sync generator 23 is connected via line 24 to the input of flip flop 66. The input of inverter 44 is connected to the output of divider 46. When AND gate 35 is enabled, switch 36 will transmit information to mixing amplifier 37. AND gate 35 will be enabled when the output of inverter 30 is high and the positive sync pulse generated by generator 23 and transmitted via flip flop 65 and flip flop 66 on line 24 is high. The output of AND gate 35 then opens analog switch 36, allowing the instructor's station signal to pass through to mixing amplifier 37.

Instructor's station 40 is the system that produces the information that the simulation instructor is currently viewing. Station 40 may be a system similar to U.S. Pat. No. 3,996,672 (previously noted). The output of station 40 is an x, y stroke writing type signal that is coupled to the input of device 41. Scan converter device 41 may be a Lithicon tube and its associated electronics. The output of scan converter device 41 is coupled to the input of analog switch 42. Scan converter 41 produces an output signal that has a conventional television raster format. Therefore, if switch 12 were set to terminal 14 which is connected to analog switch 47, an observer watching monitor 11 would see the same picture as the instructor who is looking at the instructor's station. Scan converter device 41 will record in its memory the signals produced by station 40. Information is recorded into device 41 when a positive signal produced by sync generator 23 via flip flop 65 and flip flop 66 passes through inverter 43, divide-by-two frequency divide 46, inverter 44 and arrives at one of the inputs of device 41 via line 52. The information that has been recorded into the memory of device 41 will be erased when AND gate 27 is enabled. AND gate 27 has two inputs, one of which is the output of divider 26 and the other input is connected to the output of sync generator 23 via flip flop 65 and flip flop 66 by line 24.

When analog switch 42 is enabled, it produces a signal that corresponds to every other even frame. Switch 42 will only output data when it is enabled by the output of AND gate 54. Gate 54 has two inputs, one of which is the output of divider 46 and the other input to gate 54 is the output of inverter 43. The input of inverter 43 is connected to flip flop 45 via line 24. The output of inverter 43 is also connected to the input of divider 46. Sync generator 23 transmits a vertical sync pulse via flip flop 65 and flip flop 66 on line 24. The signal is inverted by inverter 43. Thus, the output signal of switch 42 may be considered to consist of field one of the instructor's station signal and field two of the instructor's station signal which comprise frame two of the instructor's station (two fields equal one frame). The next three frames of the instructor's station signal are skipped and then switch 42 will output the first and second fields of frame six of the instructor's station signal. Hence, the output of switch 42 will be the following instructor's station frames: two, six, ten, etc. The output of switch 42 is coupled to one of the two inputs of mixing amplifier 55 and the output of amplifier 55 is coupled to one of the two inputs of amplifier 38.

Analog switch 47 functions in the same manner as analog switch 42. The difference is that while analog switch 42 passes frames two, six, ten, etc. (every other even frame) of the display system signal, analog switch 47 passes frames, four, eight, twelve, etc. (every other even frame, but displaced one even frame from the output of analog switch 42). The output signals from analog switch 42 and analog switch 47 are combined in the mixing amplifier 55. The output signal from mixing amplifier 55 therefore is a signal containing only the even frames of the instructor's station 40 signal. The output of mixing amplifier 38 thus consists of all of the odd frames of the display system 20 signal and all of the even frames of the instructor's station 40 signal alternately on a frame-by-frame basis.

Scan converter and storage device 51 may be a Lithicon storage tube and its associated electronics. The input of device 51 is coupled to the output of station 40 and the output of device 51 is coupled to the input of analog switch 47. Scan converter 51 is used to insure sufficient time to erase the information stored in device 51 and to allow for the possibility of a write cycle over running a frame time period. The output of station 40 is stored in device 51 when a positive pulse from divider 46 arrives at device 51 via line 50. This information is erased when AND gate 35 is enabled. AND gate 35 has two inputs. One of the inputs to gate 35 is the output of inverter 30. The input of inverter 30 is the output of divider 26. The second input to gate 35 is from flip flop 65. The input of inverter 44 is connected to the output of divider 46. When AND gate 45 is enabled, switch 47 will transmit information to mixing amplifier 55. AND gate 45 will be enabled when the output of inverter 44 is high, and the positive sync pulse generated by generator 23 transmitted via flip flop 65 and flip flop 66 on line 24 is high. The output of AND gate 45 then opens analog switch 47 allowing the instructor's station signal to pass through to mixing amplifier 55.

In order for an observer to view on monitor 11 the display system portion of the multiplexed video signal, switch arm 12 must be set at terminal 15. In order for an observer to view on monitor 11 the instructor's station portion of the multiplexed video signal, switch arm 12 must be set at terminal 16. Thus, if switch arm 12 is set at terminal 15, the odd numbered frames will be seen and, if switch arm 12 is set at terminal 16, the even numbered frames will be seen.

The multiplexed portion of the display system passes through mixing amplifier 37 and is amplified by amplifier 38 and mixer 60, the multiplexed portion of the instructor's station passes through mixing amplifier 55 and amplified by amplifier 38 and mixed with timing signals by mixer 60. The multiplexed video output is coupled to the input of video tape recorder 67. Video tape recorder 67 records a time display signal for purposes of setting the tape that was recorded to a particular desired time, an audio track and a composite video signal that corresponds to the display system odd numbered frames and the instructor's station even numbered frames. The output of recorder 67 is subsequently played back on playback system 100. Playback system 100 also repeats each frame once for both the odd and even frames. This results in the signal to each monitor to consist of frame one, a repeat of frame one, frame three, a repeat of frame three, etc., for the display system monitor. In a like manner, the signal to the instructor's station monitor receives a signal consisting of frame two, a repeat of frame two, frame four, a repeat of frame four, etc. This produces the desired image on each monitor without flicker since no blank frames are presented. A block diagram showing the demultiplexing technique is FIG. 2.

Still referring to FIG. 1, flip flop 65, AND gate 64, flip flop 66, timer 68 and pulse generator 63 are used to insure that when the recorded video tape is played back on recorder 67, the display system portion of the recorded information will always appear on a particular monitor and the instructor's station portion of the recorded information will always appear on a particular monitor. This is accomplished by having a code recorded on the recorded tape. One input of AND gate 64 is connected to the vertical sync output of sync generator 23 via flip flop 65 and flip flop 66 on line 24 and the second input to gate 64 is connected to the horizontal sync output of sync generator 23 via line 25. A pulse train having a rate equal to the horizontal frequency is transmitted on line 25 and a pulse train having a rate equal to one-half of the vertical frequency is transmitted on line 24. Thus, AND gate 64 will be enabled at a rate equal to every other frame. Timer 68 will be triggered when the horizontal sync pulse and the vertical sync pulse enable gate 64. The foregoing is done at a certain specified time to insure that gate 64 will be enabled at a time when the television raster is in the middle of a scan line during retrace. The output of timer 68 triggers pulse generator 63. Generator 63 transmits a pulse to AND gate 62 during the time that the television raster is drawing the first quarter of a retrace scan line. AND gate 62 will be enabled when the vertical sync pulse transmitted via line 24 arrives at the second input to gate 62. The coded output signal, hereinafter called tag, of gate 62 is amplified by amplifier 61 and mixed with the display system and instructor's station signals by mixer 60 before it is recorded by recorder 67.

When one wishes to play the recorded video tape back, it will only be necessary to use tape recorder 67 and playback system 100. Thus, the tape may be played back in another room having a tape recorder and playback equipment permitting this system to be utilized in recording other information. The foregoing is possible since the playback system will look for the tag that was recorded on the tape and perform the proper switching of the display system and instructor's station images so that they will appear on the proper monitor. The training value of this system is increased since the display system and instructor's station images always appear synchronized on separate monitors.

Figure 2:
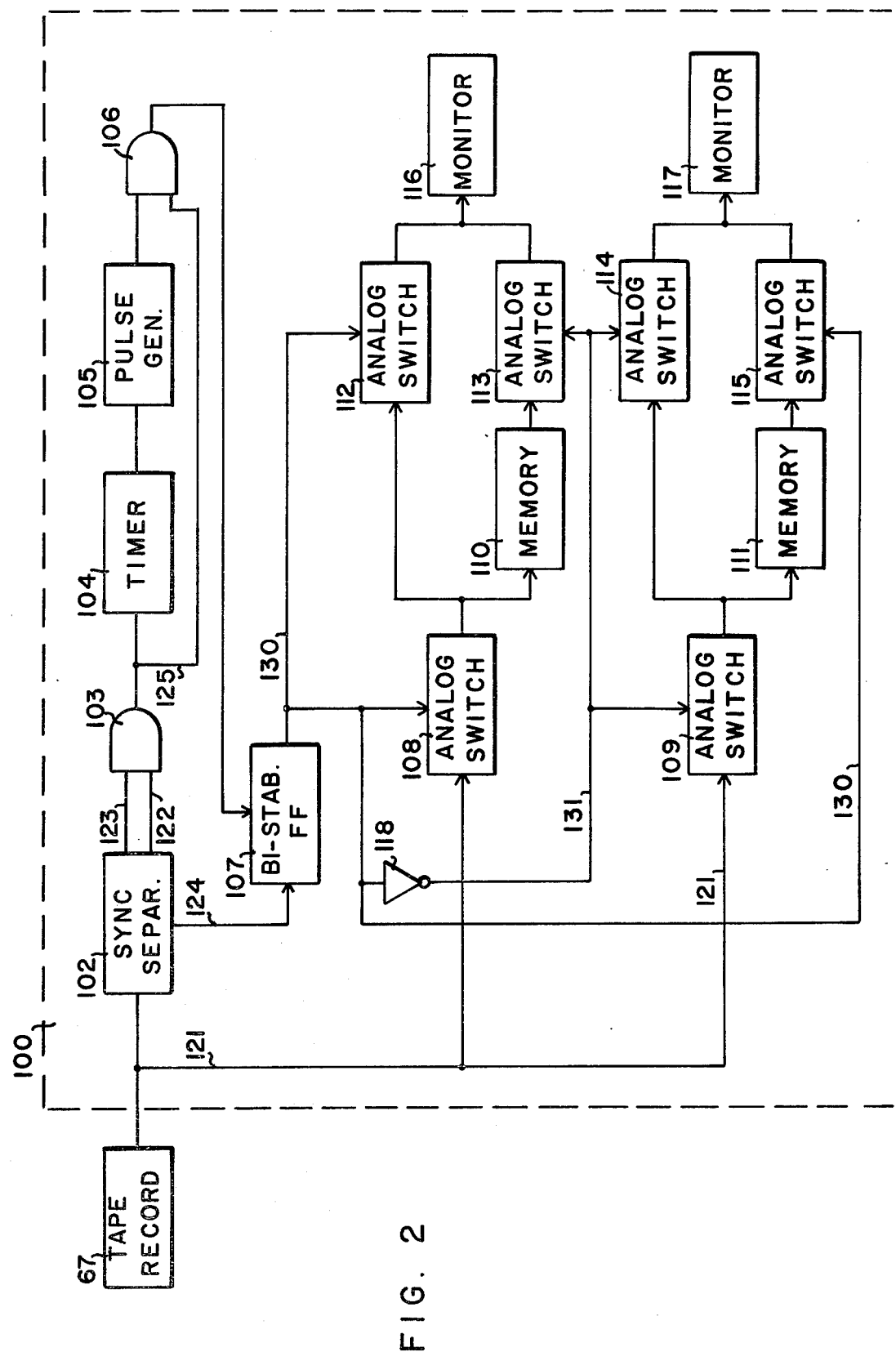
FIG. 2 is a block diagram of the electrical system that comprises the playback portion of this invention.

FIG. 2 shows the demultiplexing technique used to provide proper separation and synchronization of the data for presentation on the two display monitors. To achieve this function, playback system 100 "checks" at a specified time interval after the horizontal sync pulse during the vertical blanking interval to determine if the tag pulse is present. If the tag pulse is present, it signifies that the next frame data is for monitor 116 and the bistable flip flop is reset. This routes the video from the video tape recorder 67 to monitor 116 and to memory 110 which records this frame. The next vertical interval contains no tag pulse; therefore, the vertical sync pulse from the sync separator 102 sets the bistable flip flop 107. This routes the video from the tape recorder 67 to monitor 117 and memory 111 and allows the previously stored data from memory 110 to be sent to the monitor 116 for display. The result of this technique is to insure that the recorded display system data and instructor's station data are displayed on the proper monitor and that each frame of the two sets of data is repeated once before displaying the next frame.

Referring to FIG. 2 in greater detail, the output video signal from tape recorder 67 is connected via line 121 to the input of sync separator 102, analog switch 108 and analog switch 109. The sync separator 102 provides three outputs: a vertical blanking interval signal which is transmitted on line 123, horizontal sync pulses which are transmitted on line 122, and vertical sync pulses which are transmitted on line 124. Lines 122 and 123 are inputs to AND gate 102. The output of gate 103 is connected to the input of timer 104 and one of the inputs of AND gate 106. The output of timer 104 is connected to the input of pulse generator 105. The output of pulse generator 105 is connected to the other input of AND gate 106. The output of generator 105 are pulses at the horizontal sync pulse rate delayed by a specified time. When no tag pulse is present during the vertical sync pulse interval of the video signal that is transmitted on line 121, the pulses transmitted on line 125 will not coincide in time with the output pulses of generator 105 and therefore no reset pulse will appear at the output of AND gate 106. If a tag pulse is present during the vertical sync pulse interval of the video signal that is transmitted on line 121, it will have been delayed by the specified amount during the recording process and therefore will cause a pulse to be transmitted on line 125 which coincides in time with the delayed pulse output of generator 105. This results in AND gate 106 being enabled and causing the resetting of bistable flip flop 107. Since the vertical sync signal is transmitted on line 124, the bistable flip flop 107 is set every time period corresponding to a frame. However, flip flop 107 is reset only when a tag pulse is present. Therefore, the output of bistable flip flop 107 is a square wave whose level is high for one frame and low for the next frame. When the output of flip flop 107 via line 130 is high, analog switches 108, 112 and 115 will open and, when the output of flip flop 107 is low, analog switches 109, 113 and 114 will open. This is achieved by connecting the output of the bistable flip flop 107 directly to analog switches 108, 112 and 115 and connecting the output of flip flop 107 to the input of inverter 118 via line 130. The output of inverter 118 is connected via line 131 to the input of analog switches 109, 113 and 114. The output of analog switch 108 is a video signal identical to its input (when the analog switch 108 is open). This output is fed to analog switch 112 and memory 110. Since analog switches 108 and 112 are open simultaneously, the video signal consisting of odd frames is transmitted to the input of display monitor 116. When analog switches 108 and 112 are closed, analog switch 113 is open and the video signal for the same odd frame which was recorded in memory 110 when analog switches 108 and 112 were open is now transmitted to monitor 116. In a similar manner, the output of analog switch 109 is a video signal identical to its input when analog switch 109 is open. This output is coupled to analog switch 114 and memory 111. Since analog switches 109 and 114 are open simultaneously, the video signal for even frames is passed to display monitor 117. When analog switches 109 and 114 are closed, analog switch 115 is open and the video signal for the same even frame which was recorded in memory 111 when analog switches 109 and 114 were open is now transmitted to display monitor 117.

The logic switching hereinbefore described causes an odd frame to be displayed on monitor 116 and the same odd frame to be displayed again on monitor 116. Simultaneously an even frame is being displayed on display monitor 117 and the same even frame is displayed again on monitor 117. In this manner there is a continuity of displayed frames on the two monitors, with monitor 116 displaying all of the odd frames and monitor 117 displaying all of the even frames.

The above specification describes a new and improved system for video taping and playing back the events that take place simultaneously. It is realized that the above description may indicate to those skilled in the art additional ways in which the principles of this invention may be used without departing from its spirit. It is, therefore, intended that this invention be limited only by the scope of the appended claims.

What is claimed is:

1. A system that permits a video tape recorder to simultaneously record a plurality of independently occurring scenes involving slow image movement that are produced from stroke writing systems, said system comprising:

a. a plurality of first scan converting devices that convert and store the information from a stroke writing display system in a separate said scan converting device in order to allow sufficient time for the data to be written into one of said scan converting devices;

b. a plurality of first switching devices that are coupled to a specified video signal output of said first scan converting devices to provide a signal comprised of only pairs of even frames;

c. a plurality of second scan converting devices receiving information from a stroke writing system for the purpose of converting and storing the information contained in each scene in a separate said second scan converting device;

d. a plurality of second switching devices that are coupled to a specified video signal output of said second scan converting devices to provide a signal composed of only pairs of odd frames;

e. a plurality of first mixing devices that are coupled to the output of said first switching devices;

f. a plurality of second mixing devices coupled to the output of said second switching devices;

g. timing means coupled to said first and second scan converting devices, and first and second mixing devices, and said first and second switching devices for causing information to be stored and erased from said first and second scan converting devices at certain specified times and for causing information to be read from said first and second switching devices at certain specified times wherein said timing means comprises:

a sync generator whose output signals are constant timing pulses that are coupled to the input of said first and second scan converting devices to insure that the output of one of said first plurality of switching devices consists of alternate even frames and the output of the other one of said first plurality of switching devices consists of the other alternate even frames, and to insure that the output of one of said second plurality of switching devices consists of odd frames and the output of the other one of said second plurality of switching devices consists of the other alternate odd frames;

a plurality of cascaded flip-flops whose inputs are coupled to the output of said sync generator;

a plurality of dividers whose inputs are coupled to said cascaded flip-flops so that the frequency of said timing pulse may be changed; and a plurality of first gates and inverters whose inputs are coupled to said sync generator, said cascaded flip-flops and said dividers and whose outputs are coupled to said first and second scan converting devices and said first and second switching devices;

h. code generating means for causing a code to be written on the video tape that is being recorded on said video recorder, whereby information that was stored in said first and second scan converting devices will be multiplexed on an odd even frame basis and mixed with said coded signal so that a plurality of independently occurring scenes may be synchronously recorded at the same time.

2. The system according to claim 1, further including means coupled to the output of said first and second switching devices and the output of said first and second signal mixing devices for monitoring at various stages the scenes processed by said system.

3. The system according to claim 2 wherein said means for monitoring comprises:

a. a third switching device coupled to the output of said first switching device and the output of said first signal mixing device; and b. a display monitor coupled to said third switching device so that an observer may view at various stages the scenes processed by said system.

4. The system according to claim 3 wherein said third switching device is a manually controllable selector.

5. The system according to claim 1 wherein said first plurality of first and second scan converting devices are a plurality of stroke writers to raster scan converters.

6. The system according to claim 1 wherein said first and second switching devices are a plurality of analog switches.

7. The system according to claim 1 wherein said code generating means comprises:

a. a timer coupled to the output of said timing means;

b. a pulse generator coupled to the output of said timer;

c. a second gate whose inputs are coupled to the output of said pulse generator and said timing means; and d. a third mixing device whose inputs are coupled to the output of said second gate and the output of said first and second mixing devices.

* * * * *

UNITED STATES PATENT AND TRADEMARK OFFICE
CERTIFICATE OF CORRECTION

PATENT NO. : 4,139,868

DATED : February 13, 1979

INVENTOR(S) : Robert M. Eisenberg and George R. Quick

It is certified that error appears in the above-identified patent and that said Letters Patent are hereby corrected as shown below:

Col. 4, line 21, "the" (second occurrence) should be --then--.

Col. 5, line 18, "45" should be --65--.

Signed and Sealed this

Fifth Day of June 1979

[SEAL]

Attest:

RUTH C. MASON
Attesting Officer

DONALD W. BANNER
Commissioner of Patents and Trademarks